No. 712,666. Patented Nov. 4, 1902.
M. J. GEARY.
HAY RACK ATTACHMENT.
(Application filed July 19, 1902.)
(No Model.)

Witnesses

Inventor
Michael J. Geary
By Paul & Paul
his attorneys

UNITED STATES PATENT OFFICE.

MICHAEL J. GEARY, OF SABIN, MINNESOTA.

HAY-RACK ATTACHMENT.

SPECIFICATION forming part of Letters Patent No. 712,366, dated November 4, 1902.

Application filed July 19, 1902. Serial No. 116,179. (No model.)

*To all whom it may concern:*

Be it known that I, MICHAEL J. GEARY, of Sabin, Clay county, Minnesota, have invented certain new and useful Improvements in Hay-Rack Attachments, of which the following is a specification.

My invention relates to devices for securing a hay-rack to the timbers or sills of a wagon-frame. It is customary on a farm to utilize one set of wheels and a wagon base or frame for the running-gear of a hay-rack at one time in the season and at other times for wagon-boxes or wood-racks, and whenever a change is made considerable time and labor are expended in disconnecting or connecting up the fastening devices that hold the racks or boxes in place upon the wagon-timbers. Various fastening devices have been employed, usually consisting of bolts passing down through the rack-timbers into those of the wagon-frame. The object of my invention, therefore, is to provide fastening means which will enable the farmer to rapidly disconnect the rack or box from the wagon-frame and as readily secure them together again.

The invention consists generally in various constructions and combinations, all as hereinafter described, and particularly pointed out in the claims.

Figure 1:
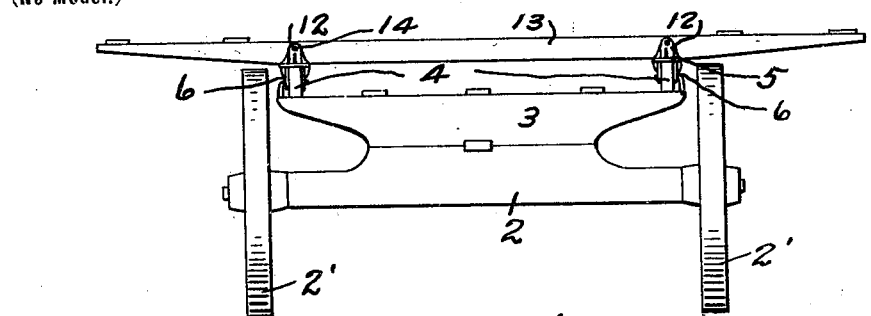
Figure 3:
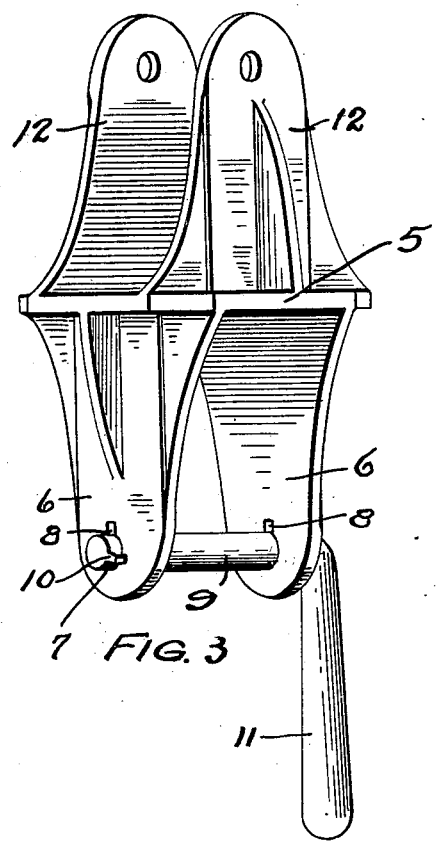
Figure 2:
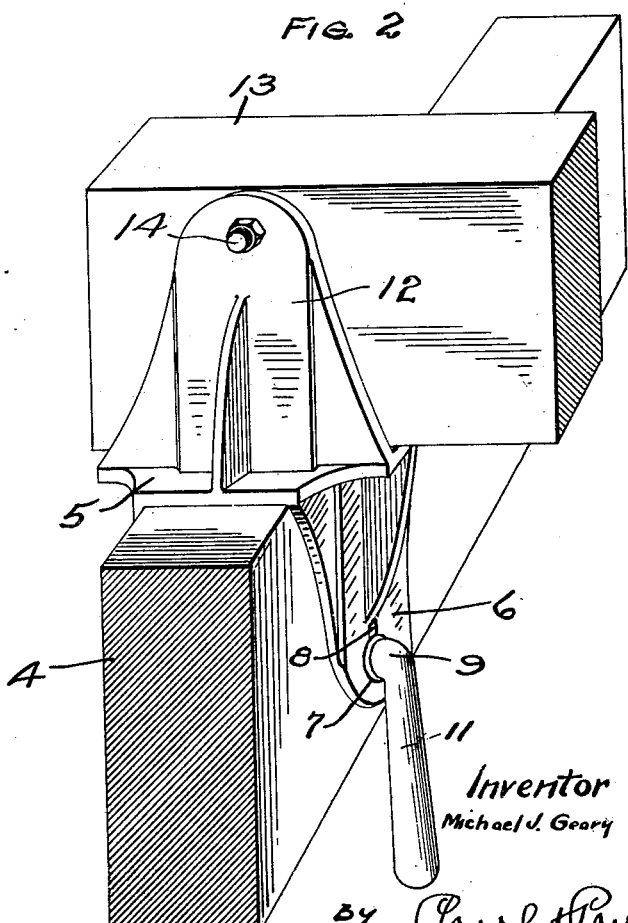

In the accompanying drawings, forming part of this specification, Figure 1 is a rear view of a wagon, showing a flat rack thereon. Fig. 2 is a perspective showing my invention applied to secure the rack to the timbers of the wagon. Fig. 3 is a perspective of the attachment itself.

In the drawings, 2 represents a wagon-axle having suitable wheels 2' and a bolster 3, between which and the other axle timbers or sills 4 are arranged. The fastening device which I prefer to employ consists of a plate 5, adapted to rest upon the top of the timber 4 and having depending brackets 6, that extend down upon each side of the timber and are provided with holes 7 and slots 8, which register with corresponding holes and slots in the timber.

9 represents a locking-pin adapted to fit into the holes 7 and the hole in the timber and provided with a lug 10, which enters the slots 8, and when the pin is partially revolved will prevent it from accidental disengagement from the brackets and timbers. On one end of the pin I prefer to provide a handle 11, the weight of which will rotate the pin sufficiently to lock it in the brackets and hold it in that position, as indicated in Fig. 3. At any time, however, the operator may raise the handle, so that the lug will be opposite the slots in the brackets, when the pin can be withdrawn lengthwise from the timber to allow the plate and brackets to be raised. On top of the plate 5 I provide upwardly-extending parallel brackets 12, that are in a plane substantially at right angles to the plane of the brackets 6, and between these brackets 12 the cross-timbers 13 of the rack are placed and secured by bolts 14 or in any other suitable way. A plate 5 is permanently secured by the brackets 12 and the bolt 14 to the timber 13 and will be removed therewith from the wagon.

A hay-rack of this type is usually provided with four cross-timbers, one at each end and two near the middle. These timbers are suitably spaced from each other and at each end will be provided with the fastening device above described. When the rack is placed on the axle-timbers, the brackets 6 will slip down over these timbers, and when the pins are inserted the plate will be firmly locked against accidental disengagement, and the brackets and their fastening devices will not only hold the timbers together, but will brace them considerably against lateral strain.

To remove the rack, it is only necessary for the operator to raise the handles 11 sufficiently so that the lugs will coincide with the slots of the brackets, when the pins can be withdrawn and the rack removed.

I claim as my invention—

1. The combination, with the wagon-sill 4, of a plate 5 removably supported thereon, brackets 6 provided on said plate and depending upon each side of said sill, brackets 12 on the upper side of said plate and substantially at right angles to the planes of said brackets 6, a rack cross-bar 13 resting upon said plate between said brackets 12 at right angles to said sill, and means for permanently securing said brackets 12 to said cross-bar.

2. The combination, with a wagon sill or side timber 4, of a plate 5 resting thereon, brackets 6 provided on said plate and depending upon opposite sides of said sill and having keyhole-slots registering with corresponding holes and slots in said sill, a rotating pin 9 adapted to fit said holes and having a lug 10 to enter said slots, a handle 11 provided on said pin substantially at right angles to the main portion thereof and adapted when said pin is inserted into said holes and the handle released to rotate said pin by gravity and move said lug away from said slots, brackets 12 provided on the upper side of said plate 5 and at right angles substantially to said brackets 6 and between which brackets 12 the rack cross-bar is placed, and means for permanently securing said brackets 12 to said cross-bar.

3. The combination, with a hay-rack cross-bar, of a plate having upwardly-projecting lugs or brackets between which the end of said bar is inserted, bolts passing through said brackets and said bar for securing said plate permanently thereto, similar brackets provided on the under side of said plate in planes substantially at right angles to said first-named brackets and adapted when the rack is placed on a wagon to straddle the sill or side timber thereon, and means for temporarily securing said last-named brackets to said timbers.

In witness whereof I have hereunto set my hand this 15th day of July, 1902.

MICHAEL J. GEARY.

In presence of—
MARGARET G. KEMP,
A. H. HOLLENBECK.